(12) United States Patent
Schramski

(10) Patent No.: US 10,575,511 B2
(45) Date of Patent: Mar. 3, 2020

(54) SELF-ENCLOSED ICE FISHING TIP-UP FISHING LINE SYSTEM

(71) Applicant: Firehouse Products LLC, Cumberland, WI (US)

(72) Inventor: Martin J. Schramski, Cumberland, WI (US)

(73) Assignee: FIREHOUSE PRODUCTS LLC, Cumberland, WI (US)

( * ) Notice: Subject to any disclaimer, the term of this patent is extended or adjusted under 35 U.S.C. 154(b) by 0 days.

(21) Appl. No.: 14/744,578

(22) Filed: Jun. 19, 2015

(65) Prior Publication Data

US 2016/0366869 A1    Dec. 22, 2016

(51) Int. Cl.
*A01K 97/01*        (2006.01)

(52) U.S. Cl.
CPC .................................... *A01K 97/01* (2013.01)

(58) Field of Classification Search
CPC ........ A01K 91/06; A01K 97/00; A01K 97/01; A01K 97/06; A01K 97/11; A01K 97/12
USPC ..................... 43/15–17, 17.5, 41, 43.1, 43.11
See application file for complete search history.

(56) References Cited

U.S. PATENT DOCUMENTS

| | | | | |
|---|---|---|---|---|
| 2,198,286 A | * | 4/1940 | Krivutza | A01K 97/01 43/17 |
| 2,636,303 A | * | 4/1953 | Feigley | A01K 97/01 116/173 |
| 4,565,024 A | * | 1/1986 | Maerz | A01K 97/01 43/17 |
| 5,097,618 A | * | 3/1992 | Stoffel | A01K 97/125 43/17 |
| 5,157,855 A | * | 10/1992 | Schmidt | A01K 97/01 43/17 |
| 5,235,773 A | * | 8/1993 | Rinehart | A01K 97/01 43/17 |
| 6,463,691 B1 | | 10/2002 | Atkins | |
| 7,207,133 B2 | * | 4/2007 | Schiemann | A01K 97/01 43/17 |
| 7,263,797 B1 | | 9/2007 | Trillo | |
| 7,395,628 B2 | * | 7/2008 | Rayfield | A01K 97/125 43/17 |
| 7,430,968 B2 | | 10/2008 | Clark | |
| 8,201,356 B2 | * | 6/2012 | Harris | A01K 97/01 43/15 |
| 8,262,049 B2 | | 9/2012 | Evanoff | |
| 2002/0095849 A1 | * | 7/2002 | Shook | A01K 97/01 43/4 |
| 2002/0139033 A1 | * | 10/2002 | Scherg | A01K 97/01 43/17 |

(Continued)

*Primary Examiner* — Lisa L Tsang
(74) *Attorney, Agent, or Firm* — Christensen, Fonder, Dardi & Herbert PLLC; Peder Jacobson

(57) ABSTRACT

An ice fishing tip-up that is adapted to rest on a sheet of ice surrounding a fishing opening in the sheet of ice. The ice fishing device has a plurality of movable supports with one end attached to a top mount and another end for resting on a surface to support the device, a spool post, a fishing line spool, and a signaling device. The plurality of supports has a storage position and a deployed position, with the storage position defining an interior storage space. In the storage position, the fishing line spool is disposed within the interior storage space. Pulling on the fishing line spool activates the switch to trigger the signaling device.

4 Claims, 8 Drawing Sheets

(56) References Cited

U.S. PATENT DOCUMENTS

2009/0272022 A1 11/2009 Grega
2015/0208634 A1* 7/2015 Box .................. A01K 97/10
   108/25

* cited by examiner

US 10,575,511 B2

SELF-ENCLOSED ICE FISHING TIP-UP FISHING LINE SYSTEM

FIELD OF THE INVENTION

The invention relates to a tip-up for ice fishing.

BACKGROUND OF THE INVENTION

Ice fishing generally involves placement and support of a spool for the fishing line having a hook on the end. After a fish is on the hook, the line is retrieved to harvest the fish. The fishing is performed through a hole made through ice on the surface of a frozen body of water, and the fishing experience involves potentially harsh conditions. Devices can be used to facilitate the sport under the encountered conditions on the ice.

SUMMARY OF THE INVENTION

In one embodiment the invention pertains to an ice fishing device adapted to be deployed over a fishing opening in a sheet of ice. The ice fishing device has a plurality of movable supports each having a top end portion attached to a top mount and a distal end for resting on a surface to support the device. The plurality of supports generally have a storage position and a deployed position. In the storage position, the supports define an interior storage space and, in the deployed position, the support distal ends rest on the surface. In general, a spool post is operatively connected to the legs and/or operatively connected to the top mount, and the spool post is further connected to a fishing line spool. The ice fishing device also has a signaling device comprising a switch operably connected to the fishing line spool. The switch is activatable by a movement of the spool to trigger the signaling device. Generally, in the storage position of the movable supports, the fishing line spool is disposed within the interior storage space, and at the deployed position of the movable supports, the fishing line spool extends past the distal support ends.

In another embodiment the invention pertains to a method for ice fishing using a fishing device. The fishing device has a plurality of legs supporting a spool post with a fishing line spool. In general, the legs have a storage position and a deployed position. In the storage position, the legs define an interior storage space, and in the deployed position, the support distal ends rest on the surface. Generally, the legs are attached at one end to a top mount. The method generally includes unfolding the legs from the storage position to the deployed position, placing the ends of the legs opposite the top mount on a sheet of ice over a body of water, and placing the fishing line spool into the opening in the sheet of ice. In general, when the ice fishing device is in the storage position, the fishing line spool is disposed within the interior storage space.

In a third embodiment the invention pertains to a process of making an ice fishing device. In general the process includes attaching a fishing line spool to a spool post and connecting the fishing line spool to a switch activatable by a movement of the line spool to trigger a signaling device and operatively connecting the spool post to a plurality of movable leg supports. In general the movable leg supports, when in a deployed position, have distal ends that support the device on a surface when deployed for use in fishing, and when in a storage position, define an interior storage space. Generally, the line spool being movable to a position that is within the storage space when the legs are in the storage position and past the distal ends when the legs are in the deployed position.

DETAILED DESCRIPTION OF THE INVENTION

A tip-up structure described herein provides a relatively easy to set up system for facilitating the ice fishing experience. The tip-up structure may comprise the following elements: moveable supports, a reel holder, and signaling devices. In some embodiments the moveable supports are attached to a top mount and can be folded into a collapsed configuration or opened into a relative flat configuration that can be laid on the ice over an opening in the ice. The reel holder can be placed with a reel into an opening in the ice. Indicator can provide signaling to the user. The various components or substantial portions thereof can be self-contained when collapsed. The various components may also glow. In a further embodiment the tip-up structure may comprise the following elements: a frame, a reel holder, signaling devices and a fabric cover to shelter the components. In some embodiments, the frame can have a teepee or tripod (multi-pod) shape with three or more legs, which in other words implies that the legs get closer together toward the top relative to the leg configuration placed on the ground when properly deployed. The reel holder can have variable positioning vertically so that the spool can be raised or lowered. Indicators can provide signaling to the user. The various components or substantial portions thereof can be self-contained when collapsed. The various components may also glow. The tip-up device provides significant improvements, including more protection of the moveable parts during storage and transport, ease of use and signaling options in comparison with the device described in published U.S. patent application 2009/0272022 to Grega, entitled "Ice Fishing Tip-Up," which is hereby incorporated by reference herein in its entirety to the extent it does not contradict what is explicitly disclosed herein. The '022 application describes a tip-up that is a ring that lays flat on the ice around the opening in the ice. In contrast, in some embodiments the tip-up is hinged and can be collapsed into a self-contained unit that protects the moveable parts.

Figure 1:
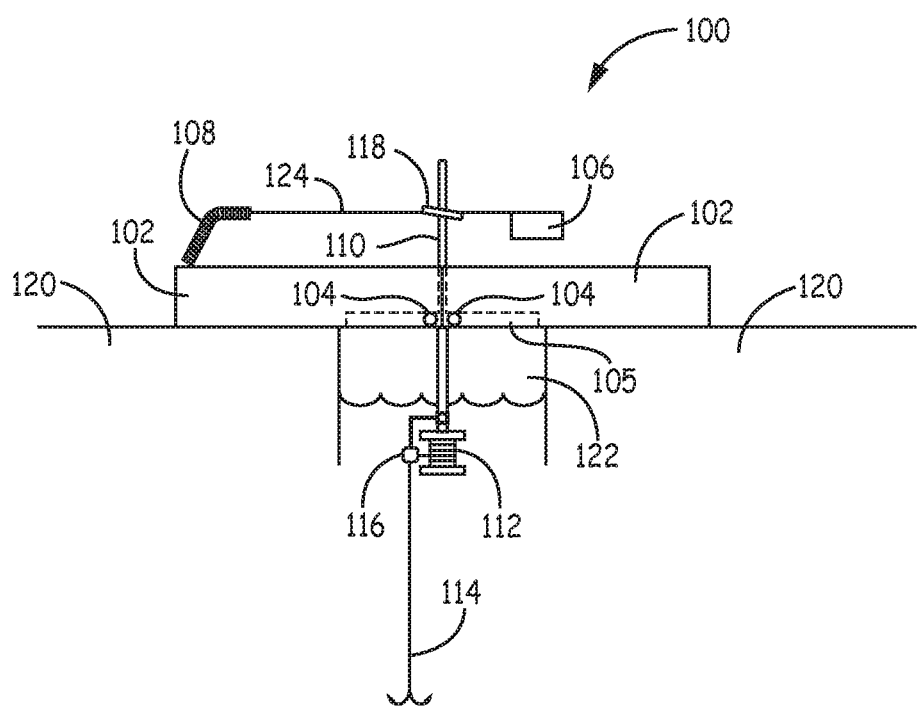
FIG. 1 is a side elevation of a self-enclosed tip-up in use in which a cross section is taken through the sheet of ice to show the relationship of the device to the ice.

With respect to the moveable supports, embodiments shown in the FIG. 1 have two moveable supports, but in other embodiments, the tip-up can have three moveable supports, four moveable supports or more. The moveable supports may be pivotally attached at the top end to a top mount, which may be a cap, beam, wheel and spoke or other structural device. The top mount may be a disk, a spoke and wheel, a solid polygon, or a polygon with a spoke and wheel type structure. The pivot may be a hinge, post, or other device that allows the moveable support to move freely about a fixed point. The exterior of the moveable supports can be covered with a woven or non-woven fabric or the like to shelter the components supported within the device, and such covers can be sewn into place, releasably attached such as with hooks, clamps, hook and loop fasteners, e.g., Velcro, or other convenient fastener, or placed like a cover with as a single piece held in place by the frame. In other embodiments, fabric may extend between the moveable supports in a web fashion. Alternatively, solid structural elements can attach as walls to the legs to similarly shelter the interior of the structure and releasable attachment of such walls can be made with a selected fastener, such as snaps, hooks, hook and loop fasteners, or other convenient fastener. In some embodiments the moveable supports may be made from a curved plastic. In such embodiments, when the tip-up is folded the curved shape of the tip-up may collapse into a self-contained cylinder or other shape with the legs acting as the outer wall of the cylinder or other shape. Flat moveable supports may also be folded to create a self-contained box or other shape. In general, the moveable supports are an elongated shape. The top end is one end of the elongated shape and generally when attached to the tip up is the end nearest the top mount. Distal is the direct further away from the top mount.

The moveable supports may comprise rounded corners to allow the moveable supports to move past each other when deployed and collapsed, while decreasing the gaps between the moveable supports when in the folded configuration. The folded or collapsed position is generally the storage position. When folded, the long edges of the moveable supports may be substantially parallel to each other and substantially parallel to the spool post. The spool post is generally a post attached to the fishing line spool. In general, the spool post moves vertically in relation to the top mount. In the collapsed position, the moveable spool post and fishing line spool may be within the moveable supports. The fishing line spool is a spool that fishing line is wrapped around and pulled from. When the moveable spool post and fishing line spool are within the moveable supports they are in the interior space defined by the moveable supports. In some embodiments, the moveable supports at least partially enclose the moveable spool post and the fishing line spool. When the moveable spool post and the fishing line spool are enclosed the moveable supports create a parameter around the moveable spool post and the fishing line spool. The parameter may have open spaces between the moveable supports. In some embodiments these spaces are smaller than the moveable supports. In some embodiments, when the moveable supports are unfolded the long edges of the moveable supports are in relatively the same plane that is substantially perpendicular to the spool post. The moveable supports may be operably connected to the spool post by arms. Arms mean an elongated moveable piece that is connected to both the moveable supports and the spool post. The moveable supports may be configured to stop at full extension by screw bolts, springs, or by coming into contact with each other along another edge.

In general, a particular embodiment can be used by first unfolding the moveable supports. When the tip-up is unfolded it is generally in the deployed position. The moveable supports will stop at full extension. Next, a user can bait the hook if desired and unspool the line to desired depth. After unspooling the line, a user sets the stopper switch. Setting the stopper switch stops the line from unspooling. Additionally, setting the stopper switch allows the motion of a fish strike to trigger the signaling mechanism. At an appropriate time, the tip-up is positioned to lower the spool into the hole in the ice and the signaling mechanism is set. The steps can be reversed to remove and store the tip-up. When the signal indicates that a fish is on the line, the spool may be raised out of the water and the line pulled up out of the water. A signaling device or signaling mechanism is any method of indicating a fish strike to a user. It may be visual, electronic, auditory, or some combination thereof.

In some embodiments, the spool is attached to a moveable spool post. The moveable spool post may be a two part post with a rod nested inside a tube. The rod may be longer than the tube and may terminate in a head that is slightly larger than the diameter of the interior circumference of the tube on one end and the spool on the other. A spring may be placed inside the tube so that when there is not tension on the fishing line the mount is not in contact with the tube. When tension is applied to the fishing line, the spring is compressed and the head is brought into contact with the tube. The contact may be used to trigger a signal. In additional embodiments the head is a T-shaped post with notches on the underside of the post. A spring is placed between the T-post and the top of the tube to provide tension. A flag with a post and spring may be used to signal and to trigger an electric signal. In embodiments with this construction, the flag spring is folded over and the flag post is placed in a notch under the T-post. The rod with the T-post is inserted through a hole in a cap. When the line and spool are pulled, the rod twists, releasing the flag post from the notch. The folded spring returns to a vertical position. If an electric signal is also used, the flag post can be used to complete a circuit or to activate a switch that turns on the electrical signal. A switch is generally is any mechanism for transferring the motion of the fishing line spool or movable spool post to activate a signaling device or signaling mechanism. In some embodiments the flag or other signaling device can be removed from the tip-up for storage.

Figure 7A:
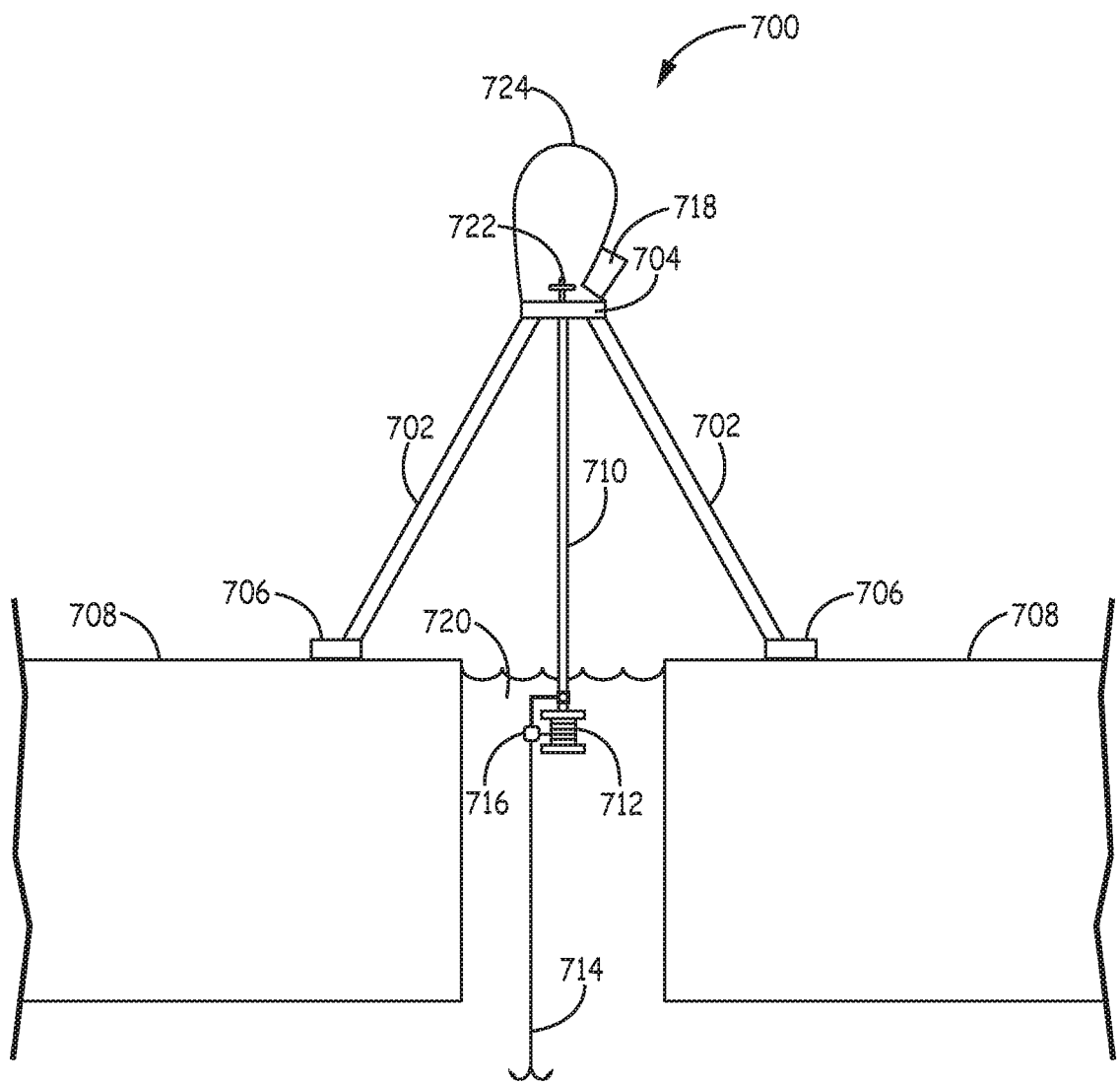
FIG. 7A is a side elevation sectional view along plane A-A of FIG. 7B of an embodiment of a tip-up with the moveable spool post attached at the top mount and signaling with a flag in which a cross section is taken through the sheet of ice to show the relationship of the device to the ice.
Figure 7B:
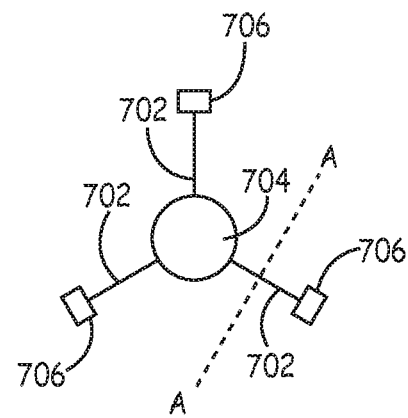
FIG. 7B is a plan of a tip-up in FIG. 7A with some elements omitted for clarity.

With respect to the frame, the embodiment shown in the FIGS. 7A and 7B have three legs, but in other embodiments, the frame can have four legs, five legs or more. An embodiment can have 6, 7, 8, 9, 10 or more legs. The frame can be made to comprise hinges or the like to provide for folding of the frame into a more compact configuration. Hinges suitable for tripod mounts or generalized versions with more than three legs are known or can be readily designed. An example of mounts for a tripod design are described, for example, in U.S. Pat. No. 8,262,049 to Evanoff, entitled "Portable Stand," which further describes foldable supports between the legs and a central column, and U.S. Pat. No. 7,430,968 to Clark, entitled "Folding Work Platform," both of which are hereby incorporated by reference herein in their entirety to the extent they do not contradict what is explicitly disclosed herein. In some embodiments, the ends of the legs can have pads or anchors to help to stabilize the deployed device. The pads can hold the device in place by weight and/or anchors can pierce the surface of the ice to provide for anchoring of the device to the ice. Anchors can have screw(s), spike shapes or the like. Anchors can be directly attached to feet near the bottom of legs or attached with tethers or the like, which can be ropes, wires or the like with screws, spikes or other gripping element at or near the end of the tether. The frame can be covered with a woven or non-woven fabric or the like to shelter the components supported within the device, and such covers can be sewn into place, releasably attached such as with hooks, clamps, hook and loop fasteners, e.g., Velcro, or other convenient fastener, or placed like a cover with as a single piece held in place by the frame. Alternatively, solid structural elements can attach as walls to the legs to similarly shelter the interior of the structure and releasable attachment of such walls can be made with a selected fastener, such as snaps, hooks, hook and loop fasteners, or other convenient fastener.

In some embodiments the legs may be made from a curved plastic. In such embodiments, when the tip-up is folded the curved shape of the tip-up may collapse into a self-contained cylinder or other shape with the legs acting as the outer wall of the cylinder or other shape. Flat moveable supports may also be folded to create a self-contained box or other shape.

A support structure for the reel generally is attached itself to the legs directly or indirectly. The support structure can comprise foldable support beams and an adjustable reel support pole supportable by the support beams. The support beams can attached to the legs and support the reel support pole. An attachment clasp can provide the interface between the support beams and the reel support pole. Various designs of the attachment clasp can provide for the raising or lowering of the reel support pole. For example, a manual screw can be tightened to secure the support pole or loosened to release the support pole for raising or lowering of the support pole. In other embodiments, support beams can have a notch removed from the end attached to the leg under the pivot post. The support beam is attached by a pivot post to the legs and by a second pivot post to the moveable spool post. When the tip-up is unfolded, support beam pivots on the post freely until the notch comes into contact with the legs. At that point, the contact prevents the tip-up from unfolding further. The reel generally is attached at or near one end of the reel support pole, which is oriented toward the hole in the ice when the tip-up is deployed. Lowering of the reel support pole can result in the lowering of the reel into the water through the hole in the ice, and raising of the reel support pole can result in the raising of the reel for the harvesting of a fish, for the preparation of the hook, for the leaving of the tip-up in an unused resting status and/or for the packing up of the tip-up. The attachment clasp can comprise various mechanisms to provide for the lowering and raising of the reel support pole, based on friction, a pivoting mechanism, a mechanical locking mechanism and release, a motorized drive, or the like. In some embodiments, the attachment clasp can comprise a spring loaded device that is loaded by pulling the reel support pole down to a stop point to load the spring. The stop can be manually released to raise the reel support pole and/or automatically triggered by a switch when indications suggest the hooking of a fish. The design of the tip-up with the shelter provided by the wall/sheeting as well as lowing of the reel into the water for use can avoid freezing of the reel. Other mechanisms can be designed to reduce the effects of any freezing.

In some embodiments, the spool is attached to a moveable spool post. The moveable spool post may be a two part post with a rod nested inside a tube. The rod may be longer than the tube and may terminate in a cap that is slightly larger than the diameter of the interior circumference of the tube on one end and the spool on the other. A spring may be placed inside the tube so that when there is not tension on the fishing line the cap is not in contact with the tube. When tension is applied to the fishing line, the spring is compress and the cap is brought into contact with the tube. The contact may be used to trigger a signal. In additional embodiments the cap is a T-shaped post with notches on the underside of the post. A spring is placed between the T-post and the top of the tube to provide tension. A flag with a post and spring may be used to signal and to trigger an electric signal. In embodiments with this construction, the flag spring is folded over and the flag post is placed in a notch under the T-post. The rod with the T-post is inserted through a hole in a cap. When the line and spool are pulled, the rod twists, releasing the flag post from the notch. The folded spring returns to a vertical position. If an electric signal is also used, the flag post can be used to complete a circuit or to activate a switch that turns on the electrical signal. In some embodiments the flag or other signaling device can be removed from the tip-up for storage.

The reel can include a trigger or other sensor to detect the likely presence of a hooked fish. Alternatively or additionally, a switch can be triggered by a motion detector or the like. The triggering of the fish sensor can lock the reel to prevent further line unwinding from the reel, trip the raising of the reel support pole to raise the reel from the water by way of a loaded spring or other mechanism, and/or provide a visible and/or audio signal to indicate to the user that a fish is hooked. Suitable signals include, for example, an audio alarm, a flag or other visible indicia, and/or lights, such as LED lights or other lighting system. Various electrical components can be operated by a battery or series of batteries, such as one or more rechargeable batteries, that can be connected in parallel and/or in series to provide a desired voltage and capacity. In some embodiments, a solar cell can be mounted on the exterior of the frame to provide for recharging of batteries. In additional embodiments the signal system may be wirelessly connected to a personal electronic device (Bluetooth etc.).

In general, a particular embodiment can be used by first reaching in the bottom of the tip-up and pull down on the spool of line until it stops. The moveable spool post will stop at full extension. Next, a user can bait the hook if desired and unspool the line to desired depth. After unspooling the line, a user sets the stopper switch. Setting the stopper switch stops the line from unspooling. Additionally, setting the stopper switch allows the motion of a fish strike to trigger the signaling mechanism. At an appropriate time, the tip-up is positioned to lower the spool into the hole in the ice and the signaling mechanism is set. The steps can be reversed to remove and store the tip-up. When the signal indicates that a fish is on the line, the spool may be raised out of the water and the line pulled up out of the water.

The various components may be made out of any suitable material, which may include plastic, metal, fiber glass, or wood. In some embodiments the components may be made to glow in the dark. The ability to glow in the dark may be obtained by using florescent plastic to construct the various parts or by painting the parts with florescent paint. Examples of florescent materials include polymers or paints incorporating Zinc Sulfide, strontium aluminate, and zinc gallogermanate. Glowing moveable supports or legs allow the tip-up to be visualized in the dark. A glowing signaling device allows visualization of whether the tip-up has been triggered. A glowing reel or spool rod may attract fish in otherwise dark water.

In some embodiments, in use fishing line is threaded through a line guide before the spool is placed in the water. The line guide can take many forms including wire loops or plastic rings. In some embodiments the line guide is a step shaped unit that clamps around the spool post. The line guide may have an elongated hole on the surface parallel to the spool post. The hole may terminate at the upper end in a taper for guiding the fishing line.

In the embodiment in FIG. 1 tip-up 100 comprises at least two supports 102 attached by rotational joint 104 to a top mount (105). Removable flag 106 is attached to support 102 at the flag spring 108. Moveable spool post 110 is placed through a hole in the top mount. At one end, moveable spool post 110 is attached to fishing line spool 112. Fishing line and hook 114 is wound around fishing line spool 112 and threaded through stopper switch 116. At the other end of moveable spool post 110 cross post 118 is attached.

In use, tip-up 100 is positioned on ice sheet 120 over opening 122. Supports 102 are opened flat and placed on ice sheet 120. In one position, fishing line spool 112, stopper switch 116, and fishing line and hook 114 are below the waterline. The line is set by engaging the stopper switch 116, which keeps the fishing line and hook 114 from extending farther. The trigger is set by bending flag spring 108 and placing flag post 124, under cross post 118. When fishing line and hook 114 is pulled by a fish, spool 112, moveable spool post 110, and cross post 118 are pulled downward and are slightly rotated. This motion removes cross post 118 from the top of flag post 124. Tension in flag spring 108 then returns flag post 124 to a vertical orientation.

Figure 2:
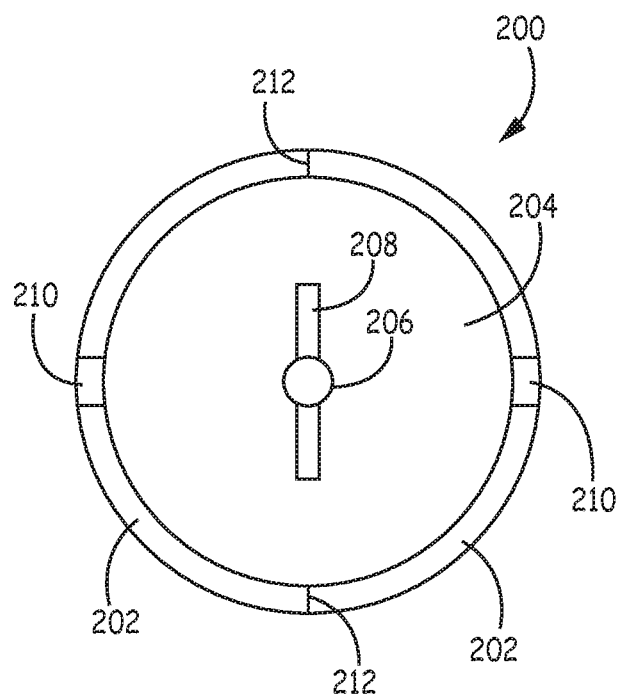
FIG. 2 is a plan of a cylindrical self-enclosed tip-up in the collapsed configuration.

In FIG. 2 a tip-up similar to the embodiment of FIG. 1 is folded into a collapsed position. Tip-up 200 comprises supports 202, top mount 204, moveable spool post 206, and cross post 208. Supports 202 have notches 210 to accommodate moveable spool post 206 when tip-up 200 is in the deployed configuration. In some embodiments seams 212 will come into contact with each other. In other embodiments small gaps may be present.

Figure 3:
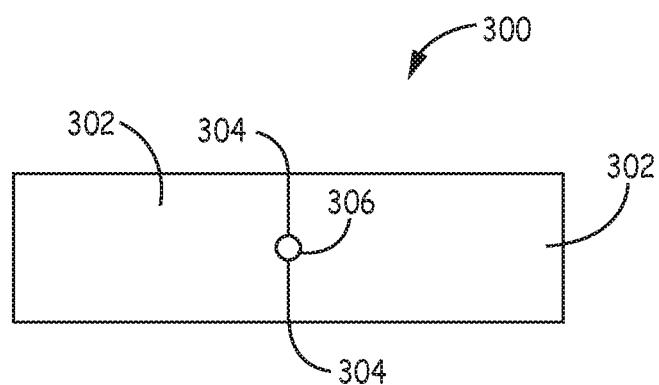
FIG. 3 is a plan of a cylindrical self-enclosed tip-up in the deployed configuration.

In FIG. 3 the tip-up 300 is in a deployed position without the moveable spool post. Supports 302 are in contact with each other along short faces 304 with notches 306 meeting to create a space for the moveable spool post.

Figure 4:
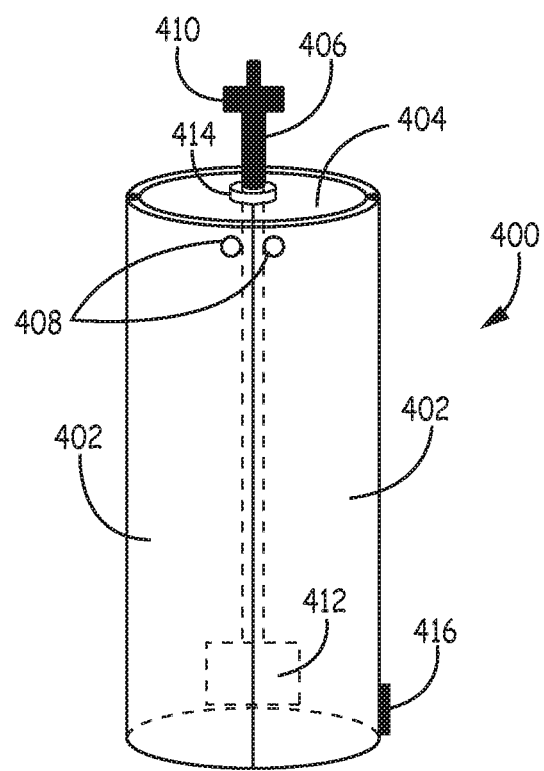
FIG. 4 is a side elevation of a self-enclosed tip-up in the collapsed configuration.

In FIG. 4 tip-up 400 is in a collapsed position. Tip-up 400 comprises at least two supports 402 attached to top mount 404 and moveable spool post 406. Supports 402 may be attached to top mount 404 by rotatable joints 408. Moveable spool post 406 has cross post 410 at one end and fishing line spool 412 at the other. Moveable spool post 406 is placed through hole 414 in top mount 404. Fishing line spool 412 is substantially enclosed by supports 402. The flag may be attached at the flag spring end to flag connection 416. Flag connection 416 may be a post, notch, hole, pin, or other suitable attachment point.

Figure 5:
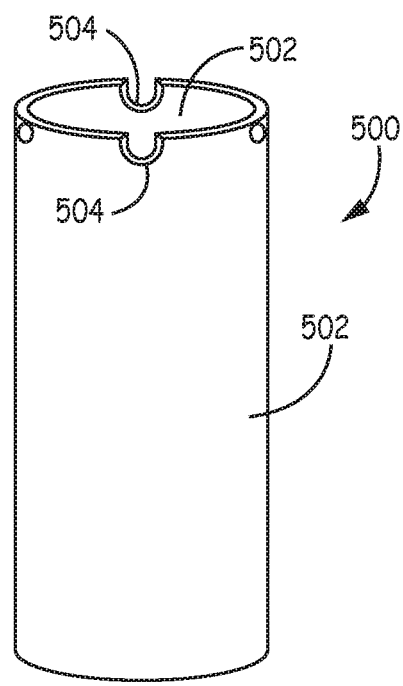
FIG. 5 is a side elevation of moveable supports in the collapsed configuration without a top mount and spool post.

Tip-up 500 in FIG. 5 comprises supports 502 without the top mount or moveable spool post. Notches 504 in supports 502 allow for supports 502 to lay flat in the deployed position. Notches 504 surround the moveable spool post in the deployed position.

Figure 6:
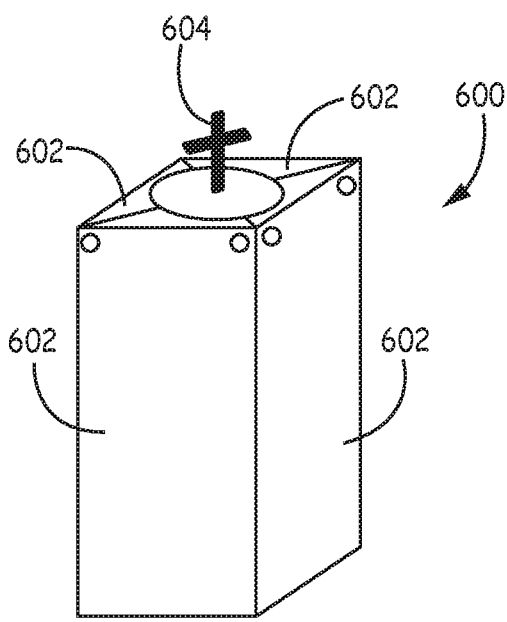
FIG. 6 is a perspective view of an alternate configuration of a self-enclosed tip-up in the collapsed configuration.

In some embodiments the supports may be flat instead of curved. In some embodiments more than two supports may be present. FIG. 6 depicts one possible embodiment of tip-up 600 where four flat supports 602 form a polygon that substantially encloses moveable spool post 604.

In the embodiment in FIG. 7A tip-up 700 comprises at least three legs 702 attached to a top mount 704. Legs 702 terminate at foot 706 which rests on ice sheet 708, such that legs 702 do not directly rest on ice sheet 708. FIG. 7B is a top view of the embodiment of FIG. 7A with some elements omitted for clarity. Moveable spool post 710 is attached at one end to top mount 704 and at the other end to fishing line spool 712. Fishing line and hook 714 is wound around fishing line spool 712 and threaded through stopper switch 716. Flag 718 is attached to top mount 704.

In this embodiment, legs 702 are attached to top mount 704 by a hinge or similar mechanism and may be locked in place at a predetermined angle, although constraints on movement of the legs may additionally or alternatively set the angle of the legs in a deployed configuration. Tip-up 700 is positioned on ice sheet 708 over opening 720. When positioned for active fishing, fishing line spool 712, stopper switch 716, and fishing line and hook 714 generally are below the waterline. Tension activated switches for general fishing devices are described further in U.S. Pat. No. 6,463,691 to Atkins, entitled "Magnetically Actuated Indicator Device for a Fishing Rod and Fishing Rig Incorporating the Device, and Method of Using the Same," and U.S. Pat. No. 7,263,797 to Trillo, entitled "Fishing Lure with Tension Activated Light," both of which are hereby incorporated by reference herein in their entirety to the extent they do not contradict what is explicitly disclosed herein, and such tension activated switches or other designs if desired can be adapted for use. Flag 718 is set by bending resilient pole 724 and clasping the flag end into to release mechanism 722. The line is set by engaging the stopper switch 716, which keeps the fishing line and hook 714 from extending farther. When a fish pulls on the fishing line and hook 714, spool 712 and moveable spool post 710 are pulled downward releasing flag 718 from release mechanism 722.

Figure 8A:
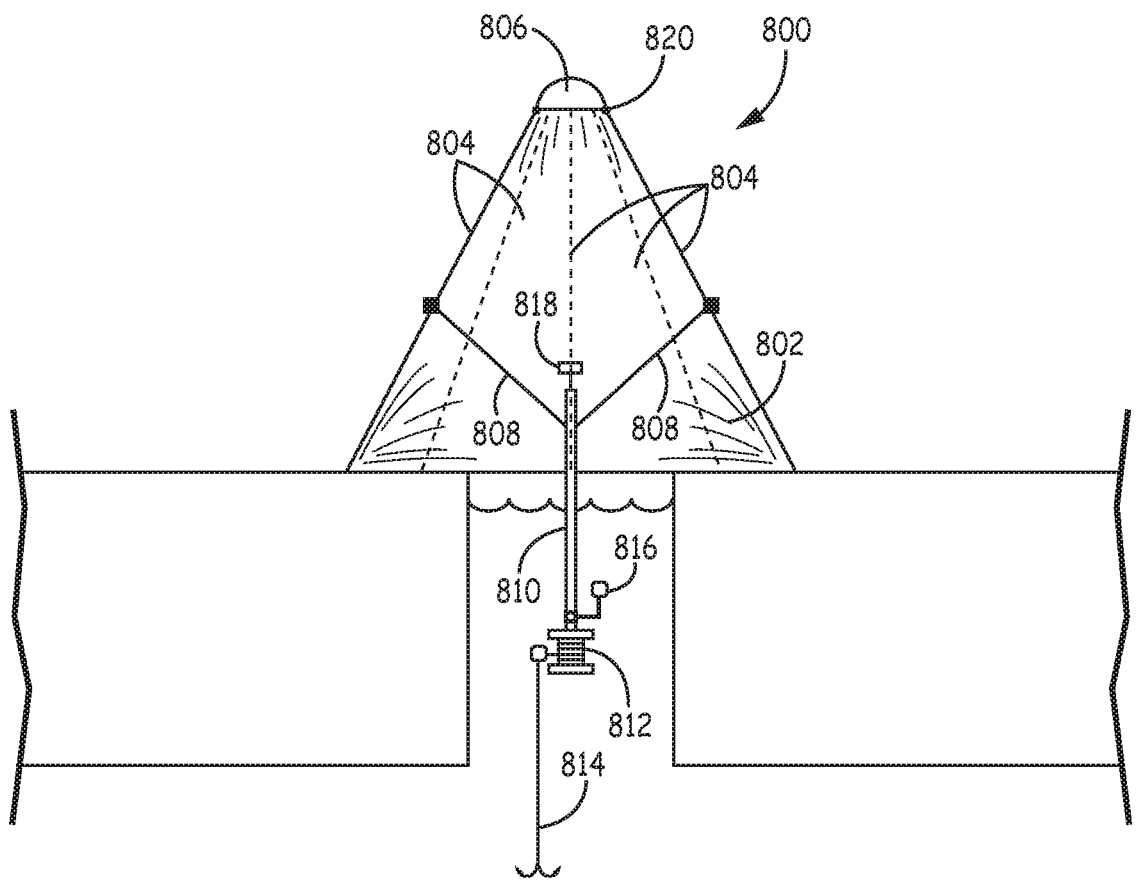
FIG. 8A is a side elevation sectional view along plane A-A of FIG. 8B of an embodiment of a tip-up with a fabric cover.

A tip-up may include a fabric cover, for example, as depicted in FIG. 8A. In FIG. 8A, tip-up 800 has cloth cover 802 over three or more legs 804 attached to top mount 806. Legs 804 are attached to top mount 806 by hinge 820 or similar mechanism and can be locked in place at a predetermined angle. Under cover 802, spring loaded arms 808 are attached to legs 804 by a rotational joint allowing for movement relative to legs 804 and moveable spool post 810. Moveable spool post 810 is attached part way along the length to spring loaded arms 808 by a rotational joint and at the ice end to fishing line spool 812. Fishing line and hook 814 is wound around fishing line spool 812 and threaded through stopper switch 816. Trigger switch 818 is attached at the top of moveable spool post 810. Trigger switch 818 wirelessly communicates with lights in top mount 806 or a personal wireless device. Wireless communication can include Bluetooth, WiFi, text message or other means of communication to a cell phone.

Figure 8B:
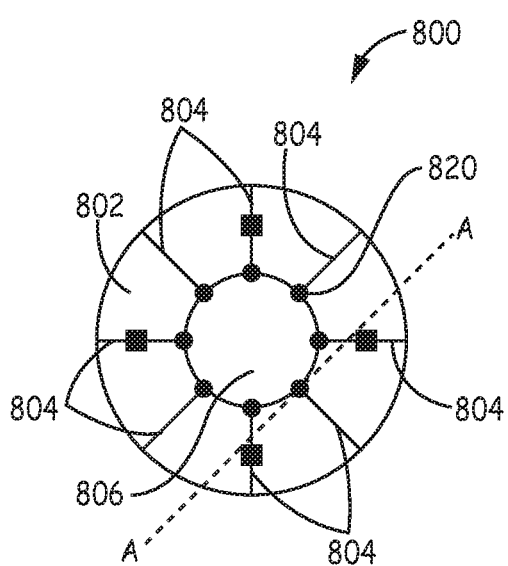
FIG. 8B is a plan of the tip-up in FIG. 8A with some elements omitted for clarity.
Figure 8C:
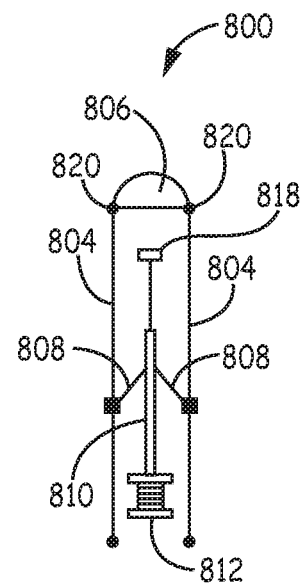
FIG. 8C is a side elevation sectional view along plane A-A of FIG. 8B of the tip-up of FIG. 8A collapsed for storage with some elements omitted for clarity.

FIG. 8B is a top view of the covered embodiment in FIG. 8A. With the hinge 820 and spring loaded arms 808, tip-up 800 can be collapsed as shown in FIG. 8C. When collapsed, moveable post 810 is moved up so that it is positioned between legs 804 and does not extend beyond them.

Figure 9:
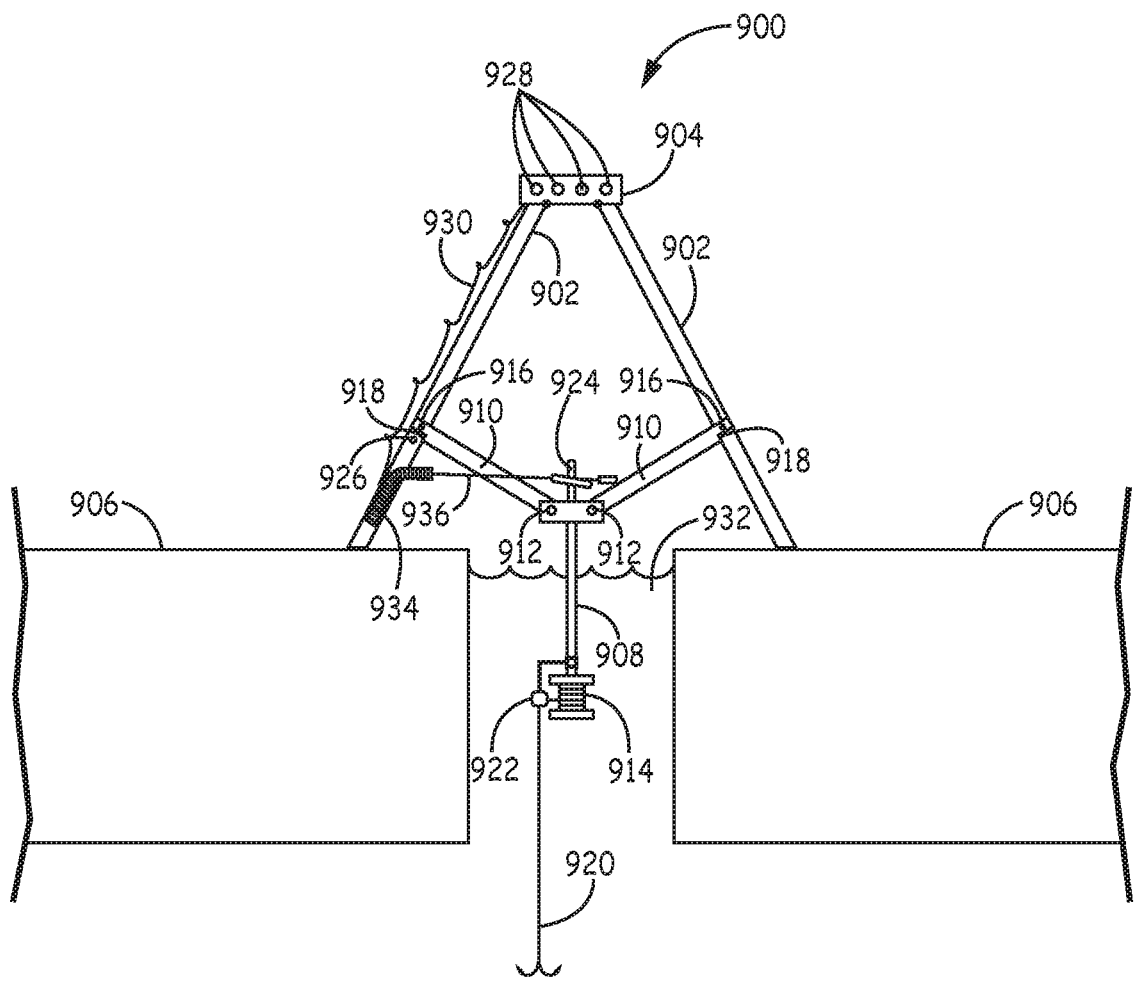
FIG. 9 is a side elevation sectional view of another embodiment of a tip-up with the moveable spool attached to support beams and signaling with a flag and lights without a fabric cover.

In FIG. 9, the embodiment of the tip-up device has a physical and an electrical signal system. Tip-up 900 comprises three legs 902 attached to a top mount 904. Further embodiment may include more than 3 legs. Legs 902 sit on ice sheet 906 on one end. Moveable spool post 908 is attached part way along the length to support beams 910 by a post rotational joint 912 and at or near the ice end to fishing line spool 914. Support beams 910 are attached to legs 902 by a leg rotational joint 916 allowing for movement relative to legs 902 and moveable spool post 908. Support beams 910 have notch 918 in the end attached to legs 902. When tip-up 900 is unfolded, support beam 910 pivots on the leg rotational joint 916 freely until notch 918 comes into contact with the leg 902. At that point, the contact prevents tip-up 900 from unfolding further. Fishing line and hook 920 is wound around fishing line spool 914 and threaded through stopper switch 922. T-Post 924 is attached at the top of moveable spool post 908. Trigger switch 926 is electrically connected to lights 928 in top mount 904 by wire 930.

In this embodiment, legs 902 can be attached to top mount 904 by a hinge or similar mechanism and extended outward for placement at a predetermined angle. In use, tip-up 900 is positioned on ice sheet 906 over opening 932. In one position, fishing line spool 914, stopper switch 922, and fishing line and hook 920 are below the waterline. The line is set by engaging the stopper switch 922, which keeps the fishing line and hook 920 from extending farther. The trigger is set by bending flag spring 934 and placing flag post 936, under T-post 924. When fishing line and hook 920 is pulled by a fish, spool 914, moveable spool post 908, and T-post 924 are pulled downward and are slightly rotated. This motion removes T-post 924 from the top of flag post 936. Tension in flag spring 934 then returns flag post 936 to a vertical orientation, where it hits trigger switch 926. Hitting trigger switch 926 completes the electrical circuit between trigger switch 926 and lights 928, turning on lights 928.

Figure 10A:
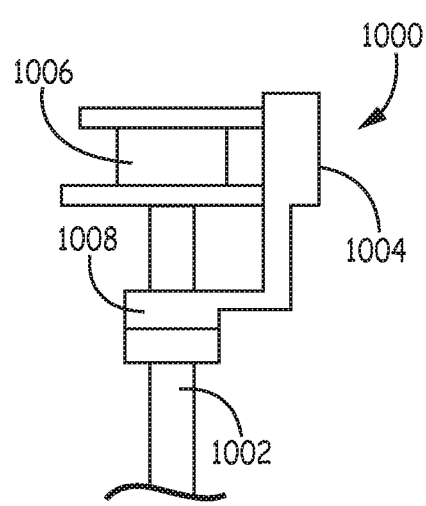
FIG. 10A is a side elevation of a fishing line guide attached to a fishing spool.
Figure 10B:
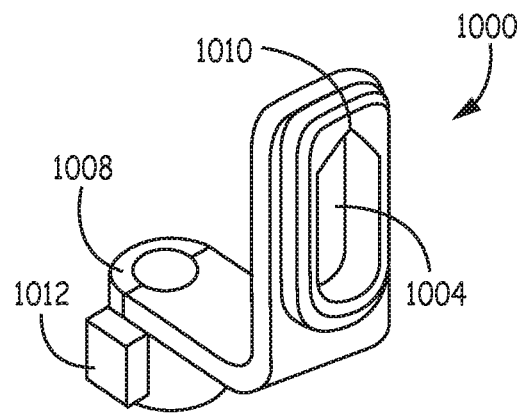
FIG. 10B is a perspective view of the fishing line guide of FIG. 10A.
Figure 10C:
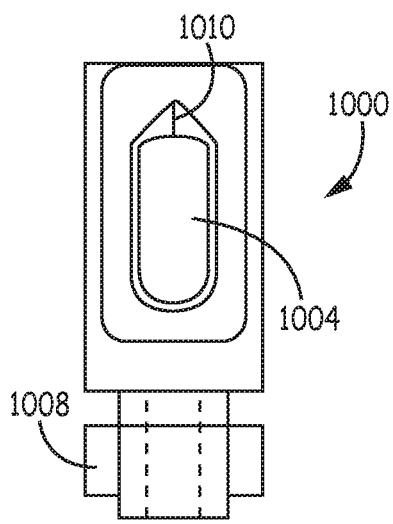
FIG. 10C is a front elevation of the fishing line guide of FIG. 10A.
Figure 10D:
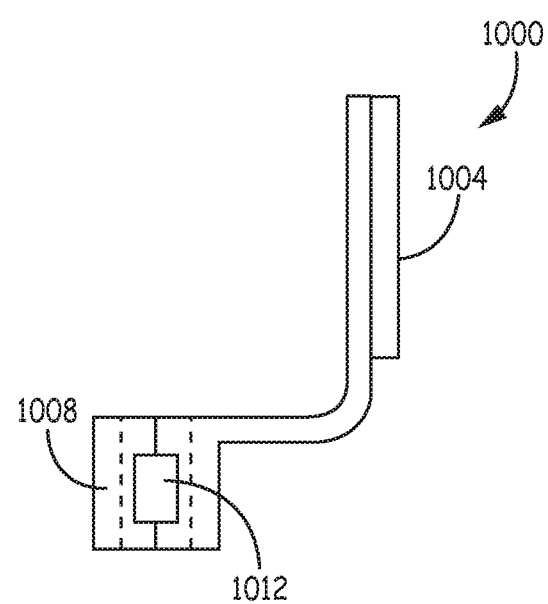
FIG. 10D is a side elevation of the fishing line guide of FIG. 10A.

In some embodiments the fishing line will be threaded through a fishing line holder. An example of the fishing line holder is shown in use in FIG. 10A. Fishing line holder 1000 is attached around moveable spool post 1002. Fishing line port 1004 is positioned in front of fishing line spool 1006. Clamp 1008 is tightened onto moveable spool post 1002. In use the fishing line is threaded through fishing line port 1004. Fishing line port 1004 may contain a tapered fishing line guide 1010, as seen in FIGS. 10B and 10C. Clamp 1008 may be molded around moveable spool post 1002 or may be tightened by adjusting a screw or other fastener in clamp joint 1012 as seen in FIGS. 10B and 10D.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. An ice fishing device adaptable to be deployed over a fishing opening in a sheet of ice, comprising:
    a plurality of rigid movable supports each having a body extending a length from a top end portion, to a distal end and defining a pair of lengthwise edges that extend between the top end and distal end, the body extending widthwise between the pair of lengthwise edges to define a width, wherein the length is longer than the width;
    a top mount attached to the top end portions of the plurality of rigid movable supports, wherein the plurality of supports, collectively, have a storage position and a deployed position wherein, in the storage position, the lengthwise edges each touch one other of the lengthwise edges of another one of the plurality of rigid movable supports along the length to define an interior storage space and wherein in the deployed position the lengthwise edges are in the same plane which is substantially perpendicular to the spool post and rest on a surface to support the device;
    a spool post operatively connected to each of the plurality of moveable supports and/or operatively connected to the top mount, the spool post being further connected to a fishing line spool; and
    a signaling device comprising a switch operably connected to the fishing line spool, the switch being activatable by a movement of the spool to trigger the signaling device;
    wherein in the storage position of the plurality of movable supports, the fishing line spool is disposed within the interior storage space and, in the deployed position of the movable supports, the fishing line spool extends past the support distal ends.

2. The ice fishing device of claim 1 wherein the spool post is movably attached directly to the top mount.

3. The ice fishing device of claim 1 wherein in the storage position, the moveable supports are substantially parallel to each other.

4. The ice fishing device of claim 1 wherein the signaling device, the movable supports, the spool post, or a combination thereof comprise a glow in the dark material.

* * * * *